United States Patent [19]

Mahmood et al.

[11] Patent Number: 4,938,945

[45] Date of Patent: Jul. 3, 1990

[54] HIGH PURITY ANHYDROUS FEF₃ AND PROCESS FOR ITS MANUFACTURE

[75] Inventors: Tariq Mahmood; Charles B. Lindahl, both of Tulsa; Ronald E. Davis, Sapulpa, all of Okla.

[73] Assignee: Pennwalt Corporation, Philadelphia, Pa.

[21] Appl. No.: 259,071

[22] Filed: Oct. 18, 1988

[51] Int. Cl.⁵ .............................................. C01G 49/10
[52] U.S. Cl. .................................................... 423/489
[58] Field of Search ................................ 423/489, 493

[56] References Cited

U.S. PATENT DOCUMENTS

| | | | |
|---|---|---|---|
| 2,904,398 | 9/1959 | Smith | 423/263 |
| 2,952,514 | 9/1960 | Smith | 423/489 |
| 4,034,070 | 7/1977 | Wojtowicz | 423/489 |

FOREIGN PATENT DOCUMENTS

406803  7/1974  U.S.S.R. .............................. 423/489

OTHER PUBLICATIONS

Chem. Abstracts, vol. 79: 26693j, Zemva, B. et al., Inst. Jozef Stefan IJS Rep. R-609.
Chem. Abstracts, vol. 72: 14306c, Gonnard P., et al., Chim. Ind., Genie Chim. vol. 102, pp. 645-651.
Chem. Abstracts, vol. 86: 37132w, abstracting Ippolitov et al., Izv. Akad. Nauk SSSR, Neorg. Mater., vol. 12, pp. 1804-1808.
Chem. Abstracts, vol. 86, 19943g, Baram, I.I.Zh. Prikl. Khim., vol. 49(8) pp. 1707-1710.
Chem. Abstracts, vol. 85: 194835Z, Lapin, P. V. et al., Sb. Annot. Nauchno-Issled Rab.-Tomsk. Politekh. Inst., vol. 6, p. 41.
Chem. Abstracts, vol. 89: 68709f abstracting Lachter et al., J. Crystal Growth 43(5) 621-627.
Chem. Abstracts, vol. 87: 87203m abstracting Wojtowicz, et al., U.S. Pat. No. 4,034,070.
Chem. Abstract, vol. 87: 15226y abstracting Opalovskii, et al. Zh. Neorg. Khim. vol 22, 1174-1177.
Chem. Abs., vol. 55, Col. 3939 abstracting Smith, U.S. Pat. No. 2,952,514.
Journal of the American Chemical Society, vol. 82, pp. 3835-3838 (1960).
Kirk Othmer, Encyclopedia of Chem. Tech., 3rd Ed., vol. 10, pp. 754-755.
Compt. Rend. hebd. des Seances de L'Acad. Des Sciences, vol. 115, pp. 944-945 (1892).
Jour. of Flourine Cham., 4, pp. 57-63 (1974).
Chem. Abs., vol. 54, Col. 3883i abstracting Smith, U.S. Pat. No. 2,904,398.
Chem. Abstracts, vol. 24, p. 306 (1930) abstracting Ruff et al. Z. anorg allgem. Chem., 183, 193-213 (1929).
Handbook of Preparative Inorganic Chemistry, vol. 1, 2nd Edition, Brauer Editor (1963), pp. 266-267 (Academic Press).
Ann. de Chemie et de Phys. (1894), vol. 2, No. 7, pp. 57-59.
Chem. Abstracts, vol. 35, 2083-2089 (1941), abstracting Nielsen, Z. anorg. allgem. Chem., 244, 85-88 (1940).
The Merck Index (1976) entries 3937 and 3946 (Merck & Co., Inc.)
Chem. Abstracts, vol. 18, p. 2061 (1924), abstracting Soc. Anon. Comp. Gen. Des prod. Chim. De Louvres, British Pat. No. 211,507, Feb. 16, 1924.
Braun, ed., Handbook of Preparative Inorganic Chemistry; Academic Press, NY, 1963, vol. 1, pp. 266-267.
Kirk-Othmer, Encyclopedia of Chemical Technology, Wiley & Sons, N.Y., 1980, vol. 10, pp. 754-755.

*Primary Examiner*—Jeffrey E. Russel
*Assistant Examiner*—Brian M. Bolam

[57] ABSTRACT

Anhydrous ferric fluoride of 99.0% purity or greater, based upon $F^-$ analysis is afforded, as well as a process for its manufacture using anhydrous $FeCl_3$ and liquid anhydrous HF, reacted in the substantial absence of $O_2$, $H_2O$, or an oxidizing agent.

16 Claims, No Drawings

HIGH PURITY ANHYDROUS FEF₃ AND PROCESS FOR ITS MANUFACTURE

BACKGROUND OF THE INVENTION

1. Field of the Invention:

This invention relates to anhydrous $FeF_3$ of 99.0% purity or greater (based upon $F^-$ analysis), and a process for its manufacture by the reaction of $FeCl_3$ and HF under specified conditions. $FeF_3$ is known as a catalyst in organic reactions and as a burning rate modifier.

2. Statement of Related Art:

Ferric fluoride ($FeF_3$) is a known substance which was synthesized as early as 1892 by heating HF to 35° C., diluting it with $N_2$, and then reacting the gaseous $HF/N_2$ mixture with $FeCl_3$ [Poulenc, et al., "Seances Acad. Sci." 115:944 (1892)] and "Ann. Chim. Phys. (7)" 2:57 (1894)].

The Merck Index, 9th ed., Merck & Co., Rahway, N.J., U.S.A. (1976) at 3937 states that $FeF_3$ has a mol weight of 112.85, comprising 50.1% F and 49.49% Fe. The compound forms green hexagonal crystals which, when powdered, gives a distinctive lime green appearance. A common contaminant of $FeF_3$ is $Fe_2O_3$ (ferric oxide) which is a well known reddish pigment, also called "jewelers rouge". [Merck entry 3946].

Kwasnik in "The Handbook of Preparative Inorganic Chemistry", 2nd ed. vol. 1, Academic Press, N.Y., U.S.A. (1963) discloses the preparation of $FeF_3$ from $FeCl_3$ and HF.

While there are many other processes for the manufacture or synthesis of $FeF_3$, many of them yield the hydrate (.1–3 $H_2O$) form, which then must be converted to anhydrous form for certain uses. This necessitates further reaction and, in the case of the trihydrate, is very difficult to accomplish.

When anhydrous $FeF_3$ is produced, it is extremely difficult to obtain in high purity (i.e., free of both contaminant cations and anions, especially of ferric oxides). Known methods for producing anhydrous $FeF_3$ include:

(A) High temperature and high pressure reactions of $F_2$ or $SF_4$ with iron oxyfluoride or iron sulfide [Claverie, et al., "J. Fluorine Chem." 4:52–63 (1974); U.S. Pat. No. 2,904,398; U.S. Pat. No. 2,952,514; and Oppergard, et al., J. Am. Chem. Soc. 82:3835 (1960)].

(B) The reaction of metallic iron with HF and a halogen in the presence of a nitrile [U.S. Pat. No. 4,034,070].

(C) The reaction of $FeCl_3$ with anhydrous HF or $F_2$, but without the disclosure of reaction conditions such as temperature, pressure, stoichiometry, etc. [Meshri, et al., Kirk-Othmer Encycl. Chem. Tech., 3d ed. 10:754–5.

(D) The reaction of $FeCl_3$ with liquid HF under free atmospheric conditions by the slow addition of the liquid HF to the solid $FeCl_3$ accompanied by removal of (gaseous) HCl by-product, followed by removal of excess HF and acquired $H_2O$ by heating [see Example 10-Comparison].

However, none of the above processes can consistently produce commercial quantities of anhydrous $FeF_3$ of sufficiently high purity, the highest being (D) above, which yields 97.0% pure $FeF_3$ (based upon $F^-$ analysis) but at only about 60 weight percent of theoretical.

Summary of the Invention

This invention affords novel anhydrous $FeF_3$ of 99.0% or greater purity based upon $F^-$ analysis, and a novel process for manufacturing anhydrous $FeF_3$ which results in a yield of at least 90 wt. % of theoretical.

The process uses an endothermic reaction having the equation:

$$FeCl_3 + 3HF \rightarrow FeF_3 + 3 HCl \uparrow$$

and comprises:

(I) reacting (A) anhydrous solid $FeCl_3$ with (B) anhydrous liquid HF, which is present in a stoichiometric or greater amount, to produce an anhydrous, solid, $FeF_3$ product, and a gaseous HCl by-product, (II) removing substantially all HCl and excess (unreacted) HF; while (III) conducting the process in a reaction atmosphere in the substantial absence of oxygen, water, or other oxidizing agent.

In a preferred embodiment, the reaction atmosphere is an inert gas, or at least the reaction mass is covered by an inert gas blanket, thus preventing contamination by atmospheric $H_2O$ or $O_2$.

DETAILED DESCRIPTION OF THE INVENTION

Other than in the operating examples, or where otherwise indicated, all numbers expressing quantities of ingredients or reaction conditions used herein are to be understood as modified in all instances by the term "about".

As used herein, the term "substantially" means beyond quantification for the given numerical values. For example, "substantially absent" means absent at least to the degree detectable for the order of magnitude of related numerical values.

As used herein, all percentages are by weight unless otherwise indicated.

Ferric fluoride ($FeF_3$) of 97% purity (based upon $F^-$ analysis) is a commercially available product and is listed in the catalogs of several research chemical suppliers [e.g. - Aldrich Chem. Co., Milwaukee, Wis., U.S.A.; Alfa Prod. Div., Morton Thiokol, Danvers, Me., U.S.A.; Sigma Chem. Co., St. Louis, Mo., U.S.A.]. However, because of the prior methods of manufacture, it has not been possible to obtain $FeF_3$ of extremely high purity. This invention affords $FeF_3$ of at least 99.0%, particularly 99.5%, most particularly 99.9% purity, based upon $F^-$ analysis. Ferric fluoride of such purity is novel per se. Analysis of $FeF_3$ is based upon $F^-$ rather than $Fe^{3+}$ because it is the anion contaminant (specifically $O^-$) which is deleterious to most uses of $FeF_3$, particularly as a catalyst. The contaminant cations in the $FeCl_3$ starting material are simply carried into the $FeF_3$ product. The predominant contaminant cation is Fe(II). Thus, $FeF_3$ which has 99.0% or higher purity based upon $F^-$ analysis, and which therefore has 1.0% or less $O^-$ contamination, forms the subject matter of this invention.

In the inventive process, the only reactants are ferric chloride ($FeCl_3$) and hydrogen fluoride (HF).

The $FeCl_3$ must be anhydrous and of very high purity. Catalyst grade $FeCl_3$, which is commercially available, is much preferred in order to minimize cation contamination in the $FeF_3$ product. Water (hydrate) contamination is particularly harmful for reasons to be discussed below.

Typical commercially available anhydrous $FeCl_3$ used herein comprises 95 wt. % ferric chloride, 2 wt. % ferrous chloride, and is a greenish-black granular solid with a molecular weight of 162.208 [from PVS Chem., Inc., Detroit, Mich., U.S.A.]. A content of up to 5% Fe(II) is acceptable, since its presence is not deleterious to the inventive product. Other cations, however, should be minimally present, preferably 3% or less.

The HF also must be anhydrous, and must be liquid at the points of addition and of reaction. Anhydrous liquid HF of high purity is commercially available from Pennwalt Corp., Inorganic Chem. Div., Philadelphia, Pa., U.S.A., has a boiling point of 19.51° C., a vapor density at 22° C. of 2.0 (air=1), and a molecular weight (unassociated) of 20.01.

The inert gas blanket may comprise any gas which is inert to the reactants and product. Nitrogen is a particularly useful inert gas because of its availability, although other gasses such as helium may be used.

The specific reaction vessel is not critical, although various practical parameters are required. The vessel must be non-reactive with both HF and the HCl gas by-product, and therefore may be comprised of a plastic such as polyethylene, or a non-reactive alloy such as nickel or nickel steel. Because the reaction is endothermic, a heated vessel may be utilized, although the application of heat usually is not required. Provision must be made for the evacuation (i.e., scrubbing) of HCl gaseous by-product as well as vaporized HF. Usually, a conventional vent and scrubber arrangement in the top of a covered but not pressurized vessel is adequate. Means for agitating the reaction mass may be provided for use when desired, such means being exemplified by internal devices such as paddle mixers, turbine mixers, and the like, or by external devices such as propeller mixers and agitators.

In the process according to this invention, the anhydrous $FeCl_3$, which is solid powder is first charged to a reaction vessel, and then the anhydrous HF, which must be in liquid form, is added on top of the $FeCl_3$. The use of liquid HF in the manner disclosed herein, rather than gaseous HF, is a most critical aspect of this invention and affords several important advantages over the prior art. Liquid HF, when added on top of the $FeCl_3$, forms a blanket which protects the reaction mass and especially the $FeF_3$ product from contact with oxygen or reactive agents such as atmospheric water. At the same time, the HCl by-product, (which has a boiling point of $-85°$ C./$-122°$ F., is generated as a gas and rises as bubbles through the liquid HF, after which it is easily evacuated from the reaction vessel, together with any HF which may vaporize. In its liquid form, the HF will sink through the $FeCl_3$ already present, and it is therefore possible to achieve complete reaction without dynamic mixing. However, depending upon the quantities of ingredients to be reacted, dynamic mixing using means as described herein may be desirable to achieve complete reaction of the $FeCl_3$ within a commercially advantageous time.

A further important function of the liquid HF is that it supplies its inherent heat to the reaction mass. This is important because the inventive process is endothermic (caused by energy loss of the HCl gas generation), and will slow down at too low a temperature. Because the HF gives up its heat to the reaction mass, this acts to keep it cool and to maintain the HF as a liquid, making it far easier and safer to handle than HF in its gaseous state, while keeping its integrity as a blanket.

Thus, the use of anhydrous liquid HF to react with anhydrous $FeCl_3$ within the parameters of this invention, affords a chemically elegant process in which the reaction thermodynamics and the additional physical advantages of the HF liquidity (i.e., providing a blanket for the reaction mass) interact in true synergy.

In a particularly preferred embodiment, the $FeCl_3$ is charged to a reaction vessel under an inert gas atmosphere, preferably anhydrous $N_2$ or He, and the inert atmosphere is maintained at least until the anhydrous liquid HF is introduced, most preferably in a quantity at least sufficient substantially to blanket the $FeCl_3$. The inert gas may then be removed adjunct to the evacuation of HCl gas generated by the reaction. The inert gas atmosphere thus serves as a transitional protection of the anhydrous $FeCl_3$ against ambient oxygen/moisture contamination, which is replaced by the anhydrous liquid HF itself. In a particularly preferred embodiment, the inert gas and the liquid HF may be introduced sequentially through the same inlet, into the reaction vessel.

As has been indicated, the reaction of $FeCl_3$ and HF is endothermic because of the generation of HCl gaseous by-product. Since the reaction preferably is conducted without external heating per se, the temperature of the reaction mass is subject to cooling below critical, which results in slow-down or even cessation of the reaction. The inventive process compensates for this energy loss, without requiring external heating of the reactor vessel, by introducing the anhydrous liquid HF reactant at a rate sufficient to maintain the reaction mass temperature at an acceptable level, so that the latent heat of the liquid anhydrous HF is transferred to the reaction mass simultaneously with the endothermic reaction of that liquid HF with the $FeCl_3$. Thus, it is a critical requirement of the invention process that the rate of introduction of liquid HF be sufficient to maintain the endothermic reaction temperature at not lower than $-25°$ C., preferably not lower than $-20°$ C., more preferably not lower than $-15°$ C., and most preferably not lower than $-10°$ C. It is a simultaneous, and independent, critical requirement that the rate of introduction of liquid HF be sufficient to maintain a blanket between the reaction mass and the atmosphere For this reason, at the ambient pressure contemplated for the reaction, the temperature of the anhydrous liquid HF must be below its boiling point of 19.51° C., particularly below 15° C. It is a further simultaneous, and independent, critical requirement that the rate of introduction and total amount of liquid HF be sufficient to react with substantially all of the $FeCl_3$. There is no maximum rate of introduction of liquid HF, provided that the protective blanket is maintained and that the rheology of the reactants permits the reaction to proceed. The lowest theoretical reaction temperature would be that of the thermodynamic equilibrium of the unreacted starting materials. However, because of the nature of an endothermic reaction, the upper temperature is of lesser consequence, as long as the HF remains liquid.

It has been found that maintaining a reaction temperature of up to $+15°$ C., preferably up to $+10°$ C. is satisfactory. Thus a preferred range is $-15°$ C. to $+15°$ C., more preferably $-10°$ C. to $+10°$ C.

The inventive process produces a yield of at least 90 wt. % of theoretical, and up to about 97 wt. % of theoretical.

Where a large amount of reactants are being processed, it may be advantageous to mix or agitate the reaction mass, simply to ensure physical contact between them within a reasonable time. The reaction is self-sustaining when the remaining inventive steps are followed, acquiring sufficient heat energy to overcome possible endothermal entropy primarily from the liquid anhydrous HF and, where needed, from ambient contacts and/or from mixing or agitation.

EXAMPLES

Example 1(a)

A polyethylene reaction vessel having one inlet and two outlets through its top was charged with 135 lb. (61.2 kg) of (95% pure) anhydrous $FeCl_3$ at ambient temperature, under an inert atmosphere of anhydrous $N_2$. The vessel lid was closed (but not hermetically sealed) and more anhydrous $N_2$ was introduced through the inlet while the outlets were connected to a scrubber. Anhydrous liquid HF was then introduced through the same inlet forming a blanket over the $FeCl_3$, and the scrubber was activated. The liquid HF was introduced at a rate of 25 lbs. (11.34 kg) per hour for four hours, and the endothermic reaction was allowed to proceed without external mixing or agitation until it was completed, which took 24 hours. The temperature was maintained by the introduced liquid HF at from $-5°$ C. to $0°$ C. Evolved HCl gas and vaporized HF gas were removed by the scrubber. When the evolution of HCl ceased, the reaction was complete. The reaction vessel was heated to $80°$ C. and maintained at such temperature for 10 hours to remove entrapped HF gas. The product was then transferred to a stainless steel tray and heated to $210°$ C. while under a nitrogen atmosphere for 4 hours to remove any remaining adsorbed, absorbed or complexed HF, as well as water of hydration, if any. The final product was allowed to cool to $80°$ C. and then quickly transferred to a drum closed with an air tight lid, where it was then allowed to cool to ambient temperature. The overall yield of the reaction was 89 lbs. (40.4 kg), which is 96% of theoretical. The product was lime green in color indicating $FeF_3$ without any visible red, which would indicate $Fe_2O_3$ contaminant.

Example 1(b)

The above example was repeated with He as the inert gas instead of $N_2$ and yielded essentially identical results.

Example 2

Example 1(a) was replicated under the same conditions and scale of ingredients except that the reaction components were mixed manually with a paddle for five minutes at 6 hour intervals beginning three hours from the initial introduction of anhydrous liquid HF. The temperature of the reaction mass was maintained between $-7°$ C. and $0°$ C. The yield was 95% of theoretical, and a lime green product was obtained.

Example 3

Example 1(a) was replicated except that 270 lbs. (122.5 kg) of anhydrous $FeCl_3$ was reacted with anhydrous liquid HF introduced at a rate of 33 lbs. (14.97 kg) per hour for 6 hours. The yield was 93% of theoretical, and a lime green product was obtained which analysis based upon $F^-$ showed to be 99.9% pure anhydrous $FeF_3$.

Example 4

Example 3 was replicated except that the reaction mass was mixed manually with a paddle for five minutes at six hour intervals beginning three hours from the initial introduction of anhydrous liquid HF. The temperature of the reaction mass was maintained between $-7°$ C. and $0°$ C. The yield was 93% of theoretical, and a lime green product was obtained which analysis based upon $F^-$ showed to be 99.9% pure anhydrous $FeF_3$.

Example 5

Example 1(a) was replicated except that 405 lbs. (176.4 kg) of catalyst grade anhydrous $FeCl_3$ was used and anhydrous liquid HF was introduced at 37 lb. (16.78 kg) per hour for 8 hours. The starting materials were permitted to react for approximately 48 hours without mixing or agitation, with the reaction mass temperature maintained at $-5°$ C. to $0°$ C. The yield was 94% of theoretical, and a lime green product was obtained which was analyzed as 99.9% pure anhydrous $FeF_3$, based upon $F^-$.

Example 6

Example 5 was replicated, except that the reaction mass was mixed manually with a paddle for five minutes at six hour intervals beginning three hours from the initial introduction of anhydrous liquid HF, and the reaction mass temperature maintained at $-7°$ C. to $0°$ C. The yield was 93% of theoretical, and a lime green product was obtained which was analyzed as 99.9% pure anhydrous $FeF_3$ based upon $F^-$.

Example 7

A nickel reactor with a steam heating jacket was charged with 1,890 lbs. (857.3 kg) of catalyst grade anhydrous $FeCl_3$, under a nitrogen blanket. A total of 1,800 lbs. (816.5 kg) of anhydrous liquid HF was then charged in two steps. In the first step, 1,200 lbs. (544.3 kg) was charged to both the top and the bottom of the reactor, at a rate of 75 lbs. (34 kg) per hour for eight hours. The reaction mass was then allowed to stand for 24 hours. In the second step, the remaining 600 lbs. (272.2 kg) of anhydrous liquid HF was charged only to the top of the reaction mass at a rate of 75 lbs. (34 kg) per hour over 8 hours. The reaction mass was then for the second time allowed to stand for 24 hours, at which point the reaction was complete. The reaction mass temperature was maintained between $-10°$ C. and $+10°$ C.. The HCl was removed by scrubbing, and excess HF was removed by steam heating of the nickel reactor at $110°$ C. for 48 hours followed by transfer of the product to stainless steel trays and further heating for 24 hours at $210°$ C. while maintained under a nitrogen atmosphere. The yield was 94% of theoretical and a lime green product was obtained which was analyzed as 99.9% pure anhydrous $FeF_3$.

Example 8

Example 7 was replicated with the same proportions of ingredients, except that the reaction mass was mixed with an external mixer [Winsmith 30 DV 25 LD bridge mount stationary mixer, 2½ horsepower 3/60/220 volt right angle gear motor, paddle-type mixer, single motion 50 rpm] for 10 minutes at three hour intervals, for only the first 24 hours. The temperature of the reaction mass was maintained at $-10°$ C. to $+10°$ C. The yield was 93% of theoretical and a lime green product was obtained which was analyzed as 99.9% pure anhydrous $FeF_3$ based upon $F^-$.

Example 9

The same nickel reactor as in Example 7 was employed. First, 2,970 lbs. (1,347.2 kg) of anhydrous catalyst grade $FeCl_3$ was introduced under a nitrogen atmosphere. Next, liquid anhydrous HF was introduced from the top of the reactor or simultaneously from the top and bottom of the reactor over the times and in the amounts stated in the Table 1.

TABLE 1

| | HF Addition-times (hours) and amounts (kilograms) | | | | | | |
|---|---|---|---|---|---|---|---|
| | Point of Addition | | | | | | |
| | Top | | | Bottom | | | Total |
| Step | amount | time | sub-total | amount | time | sub-total | Amount |
| 1 | 45.36 | 12 | 544.3 | 45.36 | 12 | 544.3 | 1,088.6 |
| interval | — | 12 | — | — | 12 | — | — |
| 2 | 68.04 | 8 | 544.3 | 37.2 | 8 | 297.6 | 841.9 |
| interval | — | 10 | — | — | 10 | — | — |
| 3 | 39.46 | 8 | 315.7 | — | — | — | 315.7 |
| interval | — | 48 | — | — | 48 | — | — |
| TOTALS | — | 98 | 1,404.3 | — | — | 841.9⁻ | 2,246.2 |

| | |
|---|---|
| total reaction time | 98 hours (4+ days) |
| (HF removal) heat time | 72 hours ( 3 days) |
| (drying) oven time | 24 hours (1 day) |
| total process time | 194 hours (8+ days) |

The rate of addition of liquid anhydrous HF resulted in maintaining the temperature of the endothermic reaction mass within $+10°$ C. to $-10°$ C. Excess HF was removed from the product by external (steam) heating of the reactor for 110° C. for 72 hours. The product was then dried (and any remaining HF removed) by heating in an oven at 210° C. in a nitrogen atmosphere for 24 hours. The yield was 2,100 lb. (952.55 kg) which was 95% of theoretical, and a lime green product was obtained having the analysis shown in Table 2.

TABLE 2

| Analysis of the Product of Example 9 | | | | | |
|---|---|---|---|---|---|
| Calculation | Total F⁻ | Fe | pH | Loss upon drying at 200° C. | $H_2O$* |
| % - Found | 50.8 | 49.1 | 3.41 | 0.25% | 0.15% |
| % - Theoretical | 50.51 | 49.49 | | | |
| % of Theoretical | 100.6 | 99.2 | | | |

*determined by Karl Fischer method.

Example 10-Comparison

Ferric fluoride was prepared according to a prior art (known) process, the product of which has been commercially available for several years. A 35 gallon (approx. 147 liter) drum was charged with 135 lbs. (61.2 kg) of catalyst grade anhydrous $FeCl_3$ under ambient atmosphere. A stoichiometric equivalent amount (or slightly more) of anhydrous liquid HF was added very slowly by: (a) continuous dripping of about half the liquid HF on top of the $FeCl_3$ over an eight hour period, (b) an interval of approx. 16 hours, and (c) continuous dripping of the remaining portion of the liquid anhydrous HF over a second eight hour period. The reaction mass was then left at ambient temperature for one week, to complete the reaction. The product was then dried in the drum at 52° C. for 16–20 hours. A reddish ($Fe_2O_3$) material formed at the top of the reaction mass and all visible reddish material—approx. 20 lb. (9.07 kg) was separated and discarded. The remaining product was a green material. The green material was transferred onto metal trays, heated at 80° C. for 12 hours, and then pulverized. Analysis showed the green material to contain 4% $H_2O$. It therefore was dried at 200° C. for one week. The yield was about 60% of theoretical, and was analyzed as 97% pure $FeF_3$ based upon F⁻ analysis.

We claim

1. A process for the manufacture of 99.0% or greater purity anhydrous ferric fluoride according to the endothermic reaction $$FeCl_3 + 3HF \rightarrow FeF_3 + 3 HCl \uparrow$$

comprising:
(I) Charging anhydrous $FeCl_3$ to a reaction vessel; then
(II) Introducing liquid anhydrous HF to said vessel, in a stoichiometric amount or greater, at an addition rate effective to maintain the temperature of a resulting reaction mass at about $-25°$ C. or higher;
(III) Permitting the resulting reaction to continue to completion;
(IV) Removing HCl by-product and any excess HF during the reaction; and
(V) Removing any HF or $H_2O$ contained in the reaction product; said reaction being conducted in the substantial absence of $O_2$, $H_2O$, or other reactive agent.

2. The process of claim 1 wherein at least a portion of said liquid anhydrous HF sufficient to blanket said $FeCl_3$ is introduced above said $FeCl_3$ and maintained above said $FeCl_3$ throughout the reaction.

3. The process of claim 2 wherein the anhydrous liquid HF is present in a greater than stoichiometric amount.

4. The process of claim 1 wherein at least said charging is conducted in an inert gas atmosphere.

5. The process of claim 1 wherein the substantial absence of $O_2$, $H_2O$, or other reactive agent is effected by
(A) charging the anhydrous solid $FeCl_3$ into a reaction vessel under an inert gas atmosphere;
(B) introducing the anhydrous liquid HF in an initial amount sufficient completely to blanket that surface of the $FeCl_3$ which would otherwise be exposed to the inert gas; and
(C) maintaining the anhydrous liquid HF blanket until the reaction is completed.

6. The process of claim 5 wherein the anhydrous liquid HF is present in a greater than stoichiometric amount.

7. The process of claim 1 wherein said endothermic reaction is maintained at a temperature of at least −15° C., by the rate of addition of said liquid anhydrous HF.

8. The process of claim 1 wherein said endothermic reaction is maintained at a temperature of at least −10° C., by the rate of addition of said liquid anhydrous HF.

9. The process of claim 1 wherein said endothermic reaction is maintained at a temperature between about −15° C. and +15° C., by the rate of addition of said liquid anhydrous HF.

10. The process of claim 1 wherein said endothermic reaction is maintained at a temperature of between about −10° C. and +10° C., by the rate of addition of said liquid anhydrous HF.

11. The process of claim 1 wherein said endothermic reaction is maintained at a temperature of about −15° C. up to below the boiling point of the HF at the reaction pressure, by the rate of addition of said liquid anhydrous HF.

12. The process of claim 1 wherein removal of substantially all gaseous HCl by-product is effected by evacuation of said HCl gas from the reaction atmosphere.

13. The process of claim 12 wherein removal of substantially all gaseous HF vaporizing from said liquid anhydrous HF is effected by said evacuation.

14. The process of claim 1 further comprising heating the $FeF_3$ product after completion of said reaction to a temperature effective to free substantially all HF adsorbed or absorbed by the $FeF_3$ or complexed therewith, as gaseous HF, accompanied or followed by further evacuation of said HF from the reaction atmosphere.

15. The process of claim 14 further comprising additionally heating the $FeF_3$ product under an inert atmosphere to a temperature effective to remove substantially all $H_2O$ present.

16. The process of claim 1 wherein:
(I) said charging is effected under an inert gas atmosphere;
(II)(a) said liquid anhydrous HF is introduced in an initial amount sufficient completely to blanket that surface of the $FeCl_3$ which would otherwise be exposed to the inert gas and said blanket is maintained until the reaction is completed,
(b) said liquid anhydrous HF is added at a rate of addition which will maintain the temperature of said endothermic reaction at not less than −20° C. until it is completed;
(V)(a) any HF in the reaction product is removed by warming to about 75° C.–120° C.; and
(b) any $H_2O$ in the reaction product is removed by heating to about 180° C.–240° C.

* * * * *